Figure 1:
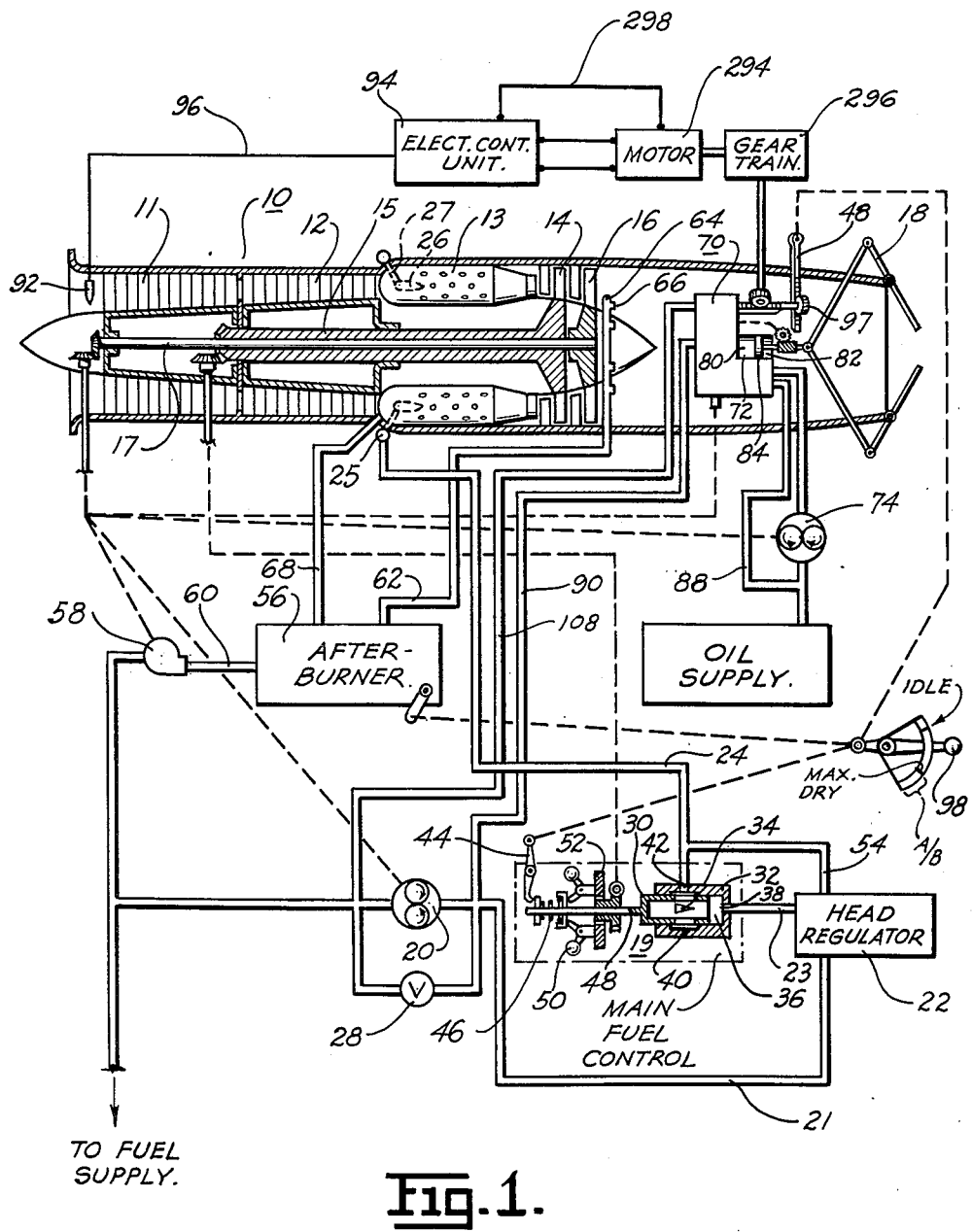

INVENTOR.
CHARLES S. LONGSTREET.
BY Cecil J Arens
ATTORNEY.

United States Patent Office 3,021,668
Patented Feb. 20, 1962

3,021,668
NOZZLE AREA CONTROL FOR TURBOJET ENGINES
Charles S. Longstreet, South Bend, Ind., assignor to The Bendix Corporation, a corporation of Delaware
Filed Jan. 11, 1957, Ser. No. 633,659
6 Claims. (Cl. 60—35.6)

This invention relates to gas turbine engines of the variable area exhaust nozzle type and more particularly to a device for controlling the area of the nozzle to obtain optimum engine operation.

Various types of turbojet engines including "single-spool" and "twin-spool" engines have been developed for providing power to sustain aircraft in flight, each type of engine having advantages peculiar to its design. The single-spool engine is provided with a single compressor drivably connected to a turbine whereas the twin-spool engine is provided with two compressors drivably connected to separate turbines which rotate independently of each other. The so-called twin-spool gas turbine engine has been developed in an attempt to improve engine operation over the condition known as compressor stall. While the twin-spool engine possesses operational characteristics which are advantageous over those of the single-spool engine, a serious disadvantage exists in that the relative speeds of the compressors must be controlled according to a particular schedule which is based upon the operational characteristics of the composite compressor to provide optimum performance over the operating range of the engine. Substantial variations from the speed schedule must not be permitted if maximum performance is to be realized. Various parameters, one of which is compressor inlet temperature, affect compressor speed in either single or twin-spool engines under otherwise fixed conditions of engine operation. Therefore, if a speed schedule is to be maintained for one or both compressors of a twin-spool engine, the speed control system must include a reference to compressor inlet air temperature.

It is an object of this invention to provide an exhaust nozzle area control which operates as a function of engine control lever position.

It is another object of this invention to provide an exhaust nozzle area control which operates as a function of the compressor inlet air temperature of the engine.

It is still another object of this invention to provide a control which operates to control engine speed as a function of exhaust nozzle area.

It is a further object of this invention to provide a control which operates as a function of engine control lever position and compressor inlet air temperature to control the exhaust nozzle area below a maximum permissible nozzle area established according to non-afterburner engine operation or afterburner engine operation.

It is a still further object of this invention to provide a nozzle area control which operates as a function of engine control lever position and/or compressor inlet air temperature to control the speed of the low pressure compressor of a twin-spool engine.

It is a different object of this invention to provide a nozzle area control which operates as a function of a plurality of engine operating parameters to govern the low pressure compressor of a twin-spool engine at a substantially constant speed.

Figure 2:
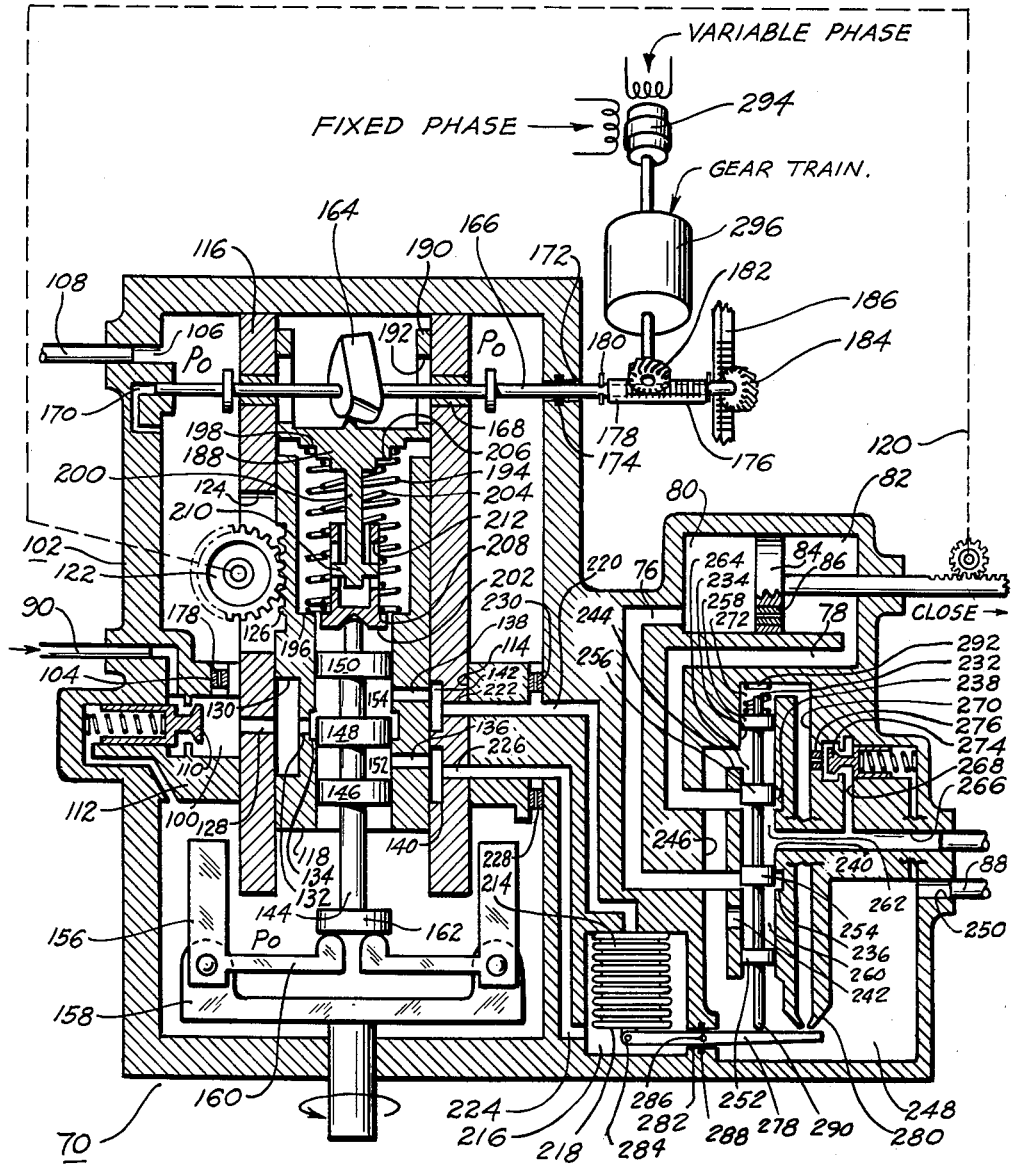

Other objects and features of the invention will become apparent from the following detailed description taken in conjunction with the following drawings, wherein:

FIGURE 1 is a schematic diagram of a control system for a twin-spool gas turbine engine in accordance with the present invention; and FIGURE 2 is a sectional view of an exhaust nozzle area control arranged in accordance with the present invention.

Referring now to FIGURE 1, there is shown a twin-spool gas turbine engine 10 having a low pressure compressor 11, a high pressure compressor 12, a combustion chamber 13, a forward turbine 14 drivably connected to the high pressure compressor through a hollow shaft 15, a rear turbine 16 drivably connected to the low pressure compressor through a shaft 17, and exhaust nozzle gates 18 which control the area of the discharge nozzle. The low pressure and high pressure compressors 11 and 12, are rotated independently of each other by the turbines 16 and 14, respectively.

A main fuel control 19 which may be of the type disclosed in Fuel Scheduling Control System for Gas Turbine Engines, Patent No. 2,720,751, issued October 15, 1955 in the name of William J. Kunz, Jr. and assigned to a common assignee is supplied fuel under pressure from a fuel pump 20 connected to a source of fuel supply, not shown, via fuel line 21, head regulator 22, and inlet passage 23, and discharges metered fuel through a conduit 24 to a main fuel manifold 25 which supplies fuel to fuel nozzles 26 via fuel lines 27. A by-pass valve unit 28 is connected across the fuel pump 20.

The main fuel control 19 functions to regulate the flow of fuel to the combustion chamber 13 in accordance with the particular speed schedule desired of the high pressure compressor 12. A chambered fuel valve 30 slidably contained in a fixed sleeve 32 is provided with calibrated orifices 34 which communicate with inlet passage 23 through a chamber 36 formed by the fuel valve and sleeve and inlet port 38 formed in sleeve 32. The orifices 34 are arranged to register with annulus 40 in fixed sleeve 32 which in turn communicates with conduit 24 via outlet port 42 in sleeve 32. The position of fuel valve 30 within sleeve 32 is determined by a throttle lever actuated link 44 which acts through a governor spring 46 operably connected to the fuel valve 30 through a spindle 48 to reset a pair of governor weights 50 mounted for rotation on an engine driven carrier 52.

The head regulator 22 communicates with outlet passage 24 via a pipe line 54 and functions to maintain a substantially constant fuel pressure differential across fuel valve 30.

An afterburner fuel control 56 receives fuel under pressure from an engine driven afterburner fuel pump 58 via inlet conduit 60 and discharges metered fuel through outlet conduit 62 to an afterburner fuel manifold 64 which supplies the fuel to afterburner fuel nozzles 66. The operation of the afterburner fuel control 56 is influenced by compressor discharge $P_c$ which is communicated thereto via pipe line 68.

A nozzle area control 70 controls the operation of a fluid motor 72 which in turn controls the position of the exhaust gates. A pump 74 supplies oil under pressure to the nozzle area control 70 which controls the flow of oil through discharge conduits 76 and 78 (see FIGURE 2) which communicate with variable volume chambers 80 and 82 respectively in fluid motor 72 on opposite sides of piston 84 connected to exhaust nozzle gates 18. The opposite sides of piston 84 are connected together via a restriction 86 (see FIGURE 2). To close the exhaust nozzle gates high pressure oil is supplied to the fluid motor through conduit 76 and to open the gates the high pressure fluid is supplied through conduit 78. A return pipe line 88 communicates the nozzle area control 70 with the inlet of pump 74. The nozzle area control 70 also receives fluid under pressure from any suitable source such as main fuel pump 20 through conduit 90. The low pressure compressor 11 inlet air temperature is sensed by a temperature responsive device 92 which relays a signal to an electronic control unit 94 via a suitable connection 96. The electronic control unit 94 includes an amplifier and a suitable power source, the latter of which may be in the form of engine driven means (not shown). An operator-operated throttle lever 98 is provided to establish a position control parameter to the main fuel control 19, and to the afterburner control 56. The nozzle area control 70 is actuated in accordance with throttle lever position through a linkage arrangement schematically shown at 97. The afterburner fuel control 56 may be of the type disclosed in application Serial No. 555,882, filed December 28, 1955, now abandoned, in the name of T. B. Card, F. R. Rogers and R. R. Riggs and assigned to a common assignee.

The electronic control unit 94 may be of the type disclosed in application Serial No. 380,306, filed September 15, 1953 in the name of George Ducoff and assigned to a common assignee.

Referring now to FIGURE 2, there is shown a schematic illustration of the nozzle area control 70 of FIGURE 1. A chamber 100 located in casing 102 receives fuel at a relatively high pressure from pipe line 90 (see FIGURE 1). The chamber 100 is vented through a restricted passage 104 to the interior of casing 102 which communicates with the inlet of pump 20 via outlet passage 106 in casing 102 and pipe line 108 (see FIGURE 1). A spring loaded pressure regulating valve 110 serves to maintain a constant predetermined pressure supply in the chamber 100. The casing 102 is formed with a laterally extending partition 112 provided with an opening 114 into which a cylindrical sleeve 116 is fitted for slidably receiving a valve sleeve 118. A mechanical feedback connection 120 is operably connected between the shaft of piston 84 and a pinion 122 rotatably mounted in an aperture 124 in sleeve 116. The pinion 122 engages a rack 126 formed in valve sleeve 118. The cylindrical sleeve 116 is securely held in position by being press fitted in the opening 114. A passage 128 in the sleeve 116 communicates the chamber 100 with the interior of said sleeve. The valve sleeve 118 is provided with a port 130 which communicates with passage 128, said port being slotted so as to maintain communication with passage 128 when moved axially. The valve sleeve 118 is formed with passage 132 and annulus 134 which communicate slotted port 130 with the interior of said sleeve. Passages 136 and 138 oppositely disposed to annulus 134 in valve sleeve 118 communicate the interior of said sleeve with ports 140 and 142 respectively, in cylindrical sleeve 116. A valve member 144 slidably received by valve sleeve 118 has three lands 146, 148 and 150 connected by reduced portions forming valve chambers 152 and and 154 which communicate at all times with passages 136 and 138, respectively. The effective flow area of annulus 134 is controlled by land 148 which also serves to establish communication to valve chamber 152 or 154 depending upon the position of valve member 144.

The valve member 144 is moved axially in response to the output force of a pair of weights 156 mounted on a carrier 158 having a driving connection with the low pressure compressor 11. The weights 156 are pivotally mounted and are provided with arms 160 which engage a thrust bearing 162 formed on the end of valve member 144.

A three-dimensional cam 164 is fixedly mounted on a rod 166 which extends through two bushings 168 oppositely disposed to one another in fixed sleeve 116. The rod 166 is rotatably and axially journaled at one end in an aperture 170 in casing 102 and at the opposite end in an opening 172 in casing 102 through which the rod extends. An O ring is contained in a recess 174 to seal the opening 172 against leakage. A rack 176 is formed on a sleeve 178 rotatably carried on the outer end of rod 166. Suitable retaining members 180 are provided to fixed sleeve 178 in position axially on rod 166. The rack 176 is engaged by a pinion 182 operably connected to a gear train for driving the rod 166 in an axial direction. A pinion 184, securely mounted on the free end of rod 166, is engaged by a throttle lever actuated rack 186 to rotate the rod. The cam 164 rides on follower member 188 slidably received within fixed sleeve 116. The follower member 188 is provided with an axially extending flange 190 having slots 192 diametrically disposed therein to receive the rod 166 and permit axial movement of said follower member. A spring 194 interposed between a shoulder 196 on sleeve 118 and a shoulder 198 on follower member 188 acts to urge the follower member into contact with cam 164. A reduced diameter portion 200 of follower member 188 extends within a cup shaped retainer 202 which is held in abutment with the end of valve member 144 by a spring 204 interposed between a shoulder 206 on follower member 188 and a shoulder 208 on the spring retainer. A stop member 210 is securely attached to the reduced diameter portion 200 and extends at right angles therefrom into sliding engagement with slots 212 in the spring retainer 202 such that the travel of the spring retainer with respect to the follower member is limited by engagement of the stop member with the ends of slots 212.

A bellows 214 is housed within a chamber 216 in casing 102, one end of the bellows being secured to said casing through any suitable means providing a fluid seal and the opposite end being sealed by a cover plate 218. A passage 220 connects the interior of bellows 214 with the port 138 via a passage 222 in fixed sleeve 116 and a passage 224 connects chamber 216 with port 140 via passage 226 in fixed sleeve 116. Restricted bleed passages 228 and 230 communicate passages 224 and 220, respectively, with the interior of casing 102 at pump inlet pressure $P_0$. A valve 232 is slidably received in a bore 234 provided with annular discharge ports 236 and 238 which communicate with conduits 76 and 78, respectively; an inlet port 240, and drain ports 242 and 244 which communicate with return pipe 88 via a passage 246, a chamber 248 and port 250. The valve 232 is provided with four lands 252, 254, 256 and 258 connected by reduced portions forming valve chambers 260, 262, and 264 which communicate at all times with drain port 242, inlet port 240 and drain port 244, respectively. High pressure oil is supplied to the inlet port 240 from pump 74 via inlet passage 266. A branch passage 268 communicates inlet passage 266 with a passage 270 which supplies oil to a variable volume chamber 272 disposed at one end of bore 234. A servo pressure regulating valve 274 disposed in branch passage 268 is provided to maintain a constant predetermined supply of pressure to passage 270. A restriction 276 is removably secured in branch passage 268 downstream from the regulating valve 274. The variable volume chamber 272 pressure level is controlled by a lever 278 which coacts with a valve seat 280 to vary the effective flow area of the discharge end of passage 270 which communicates with chamber 248 at oil drain pressure. The lever 278 extends through an opening 282 in casing 102 into pivotable engagement with a link 284 fixedly secured to cover plate 218 and is arranged to rotate about a pin 286 fixedly secured to casing 102. A seal is contained by a recess 288 in casing 102 to provide a fluid seal between chambers 216 and 248. An extension 290 of valve is held in contact with lever 278 by a spring 292 disposed in variable volume chamber 272.

Assuming engine operation to be steady state in the non-afterburning range the ratio of speeds between the high and low pressure compressors is governed according to the setting of the throttle lever 98. The main fuel control valve 30 is held in equilibrium by the governor weight 50 force in accordance with the governor spring 46 load established by the throttle lever 98. The fuel flow to the combustion chambers 13 is in direct relation to the area of the orifices 34 since the fuel pressure differential across the valve 30 is maintained substantially constant by the head regulator unit 22.

The movable parts of the nozzle area control 70 will be positioned as shown in FIGURE 2 with a balance of forces existing across valve 144 and thus valve 232 such that a constant nozzle opening area is maintained to control the low pressure compressor speed constant.

At any given point along the axial length of cam 164, the cam radius is constant for all positions of the throttle lever during dry engine operation and variable depending upon the position of the throttle lever during wet, or afterburner, engine operation. Therefore, the position of the follower member as established by the cam at idle control lever position will remain fixed during dry engine operation regardless of control lever position unless the axial position of the cam varies in response to a change in compressor inlet temperature, at which time the follower member will be repositioned. During wet, or afterburner, engine operation, the position of follower member 188 will vary according to the position of throttle lever 98 and/or axial movement of cam 164.

When the control lever 98 is repositioned to a higher selected speed in the dry range, the main fuel control governor spring 46 is activated to reset the high pressure compressor governor weights 50 and move valve 30 to a position which allows a larger opening of orifices 34 and a corresponding greater fuel flow to the combustion chamber 13. The cam 164 rotates in accordance with the position of throttle lever 98 but due to the aforementioned constant radial contour of the cam, follower member 188 remains in its original position. Subsequently, as the speeds of the low pressure and the high pressure compressors tend to increase, the low pressure compressor weights 156 respond to cause an unbalance of forces acting against valve 144. The valve 144 is displaced against the spring 204 thus causing a shift of land 148 with respect to annulus 134 to disestablish flow to valve chamber 154 and establish flow to valve chamber 152. The pressure within bellows 214 is then vented through passages 220 and 230 to drain pressure $P_0$. The bellows 214 tends to collapse in response to the pressure differential across cover plate 218 thus rotating lever 278 in a clockwise direction. The valve 232 follows lever 278 in response to the force exerted by spring 292 plus the variable volume chamber 272 pressure applied force. Pressurized oil is permitted to flow from valve chamber 262 through annulus 236 and passage 76 to variable volume chamber 80, thence through restriction 86 in piston 84 to variable volume chamber 82 from which the oil flows through passage 78, annulus 238, valve chamber 264, port 244 and passage 246 to chamber 248 at drain pressure. Piston 84 responds to the applied pressure differential and moves to close the exhaust gates which in turn reduces the nozzle area. The reduction in nozzle area causes an increase in back pressure against turbine 16 and a subsequent reduction in low pressure compressor speed. The output force of weights 156 decreases thus allowing valve 144 to move under the influence of spring 204. The feedback mechanism 120 responds to movement of piston 84 to cause rotation of pinion 122 such that subsequent to movement of valve 144 the valve sleeve 118 is driven in a follow-up action to movement of valve 144. The effective area of annulus 134 is decreased thus reducing the fluid flow through valve chamber 152 to chamber 216 and decreasing the pressure differential across cover plate 218. The lever 278 coacts with valve seat 280 to adjust the fluid pressure in variable volume chamber 272, which pressure in addition to the spring 292 force acts in opposition to the lever 278 applied force to balance the valve 232. Thus a constant pressure differential is established across piston 84 and the exhaust gates are stabilized in position. The main fuel control valve 30 is balanced by the governor weight 50 force at a speed corresponding to the newly selected throttle position and the engine is again controlled to a steady state condition.

Upon an actuation of throttle lever 98 to a selected lower engine speed position, the main fuel control 19 functions to decrease fuel flow to the combustion chambers which causes a decrease in low pressure and high pressure compressor speeds. The valve 144 operation sequence will be reversed from that described previously, since the valve will be unbalanced by a decreasing force from weights 156. The pressure differential established by the valve 144 across cover plate 218 acts to cause counterclockwise rotation of lever 278, which in turn controls the position of valve 232 such that the piston 84 moves to increase the nozzle area. The back pressure against turbine 16 is caused to decrease, which, in turn causes a subsequent increase in low pressure compressor speed. The feedback mechanism 120 functions to reduce the pressure signal to bellows 214 by controlling valve sleeve 118 in the aforementioned follow-up action. When the low pressure compressor is on-speed, the valve 144 and valve sleeve 118 will be in equilibrium and the required nozzle area will be maintained.

The exhaust gates 18 are limited to a maximum open position by the action of stop member 210 which engages the end of the slots 212 to limit the action of the spring 204 against valve 144. When the spring retainer 202 is engaged with stop member 210, a further decrease in low pressure compressor speed has no effect on the position of valve 144 and the nozzle area will remain fixed at its maximum permissible value. The purpose of establishing limits to the nozzle area in the above mentioned manner will be apparent to those persons skilled in the art who are aware of the peculiar characteristics of twin spool gas turbine engines. In the case of the present invention as shown and described, the speed of the low pressure compressor is limited in the above mentioned manner to prevent the occurrence of low pressure stall. While the high pressure compressor operation is controlled by the main fuel control independently of the low pressure compressor, it is readily apparent that variations in fuel flow which effect desired control over the high pressure compressor speed must be considered if low pressure compressor speed is to be controlled by virtue of the operating relationship between the low and high pressure compressors. Assuming that the high pressure compressor is operating at its maximum speed under control of the main fuel control governor and compressor discharge pressure reaches a predetermined maximum allowable value, conventional compressor pressure limiting apparatus, not shown, may operate to override the high pressure compressor governor and decrease fuel flow to thereby reduce the high pressure compressor speed and thus compressor discharge pressure. The low pressure compressor speed will also tend to decrease by virtue of the decrease in fuel flow whereupon the resulting speed signal would call for an increase in nozzle area to re-establish the selected speed of the low pressure compressor. However, the speed of the low pressure compressor must, under certain operating conditions, be limited to prevent the low pressure compressor from entering stall. Since the stall conditions vary as a function of compressor inlet temperature, the nozzle area which controls low pressure compressor speed is limited to a maximum value by the adjustable stop irrespective of the weight force acting against the spool valve which weight force under the above mentioned conditions indicates an underspeed condition. This is but one example of the utility of the adjustable stop. Depending upon the characteristics exhibited by a given twin spool engine, there may be other advantages in establishing a maximum allowable nozzle area as those persons skilled in the art will recognize.

During wet, or afterburner, engine operation, the throttle lever 98 controls the position of cam 164, the contour of which is such that the follower member 188 and stop member 210 are reindexed to allow greater maximum nozzle area as power output request approaches a maximum.

To illustrate this operation, the following will occur in response to a control lever request for afterburner operation. The afterburner fuel control 56 will initiate fuel flow to the afterburner fuel manifold in accordance with a predetermined afterburner fuel flow schedule. The cam 164 will displace follower member 188 toward valve 144, thus reindexing stop member 210 as well as acting to compress or preload spring 204, which force overcomes the weights 156 force to unbalance valve 144 causing a pressure rise in the interior of bellows 214. In the manner heretofore described, the bellows expands to cause opening of the exhaust gates 18. As a result of afterburner fuel combustion, the temperature or the exhaust gases upstream of the nozzle gates 18 rises causing an increase in back pressure against the low pressure compressor turbine 16 which increase causes a reduction in low pressure compressor speed. The output force of weights 156 decreases causing a further displacement of valve 144. The stop member 210 will function to limit the position to which spring 204 can displace valve 144. As the exhaust gates 18 open, low pressure compressor speed increases. The feedback mechanism 120 controls valve sleeve 118 in the aforementioned follow-up action. The valve 144 responds to the output force of weights 156 and is urged against the spring 204 until the valve 144 is again balanced; at this time land 148 coacts with annulus 134 to maintain a constant pressure signal to bellows 214 and a corresponding stabilized position of exhaust gates 18. Since one end of spring 204 is referenced to the follower member 188, the reindexing of follower member 188 in response to afterburner operation and/or compressor inlet temperature variation causes a slight increase in the spring load acting against valve 144 which in turn requires that a slight compressor off-speed condition exists to balance the valve 144. At maximum speed, the force of weights 156 increases or decreases significantly with respect to small changes in compressor speed and the aforementioned off-speed condition is relatively insignificant.

At any given exhaust nozzle area, compressor speed will vary significantly with changes in temperature of compressor inlet air. To reset the maximum area stop 210 and to reduce the error caused by the proportional effect of the spring 204 the cam 164 is actuated axially in response to rotation of a two-phase motor 294, which is provided with a conventional fixed phase winding and a variable phase winding and which provides the driving force for pinion 182 via gear train 296. The position of the motor is controlled by temperature responsive bulb 92 which responds to the inlet air temperature to establish an input signal to the electronic control unit 94 which in turn amplifies the signal and causes rotation of motor 294 in one direction or the other depending upon the direction in which the temperature varies. A feedback circuit 298 is operatively connected between the motor 294 and the electronic control unit 94. If the inlet air temperature increases, the motor 294 will cause pinion 182 to drive the rod 166 toward casing 162. The follower member 188 is then caused to move in response to a rising cam 164 contour to displace valve 144 against weights 156 thereby increasing the flow of fluid through annulus 134 and valve chamber 154 to the interior of bellows 214. The bellows 214 responds to control the position of valve 232, which in turn controls piston 84 and exhaust gates 18 in an opening direction. As valve 144 reaches a balanced condition, valve sleeve 118 assumes a position in response to the feedback control mechanism 120 such that the pressure signal to bellows 214 is reduced to maintain the necessary fixed area of the exhaust nozzle 18.

If the compressor inlet temperature decreases, the above mentioned sequence of operation is reversed to establish a smaller nozzle area.

Although only one embodiment of the present invention has been schematically illustrated and described, it will be apparent to those skilled in the art that various changes in the structure and relative arrangement of parts may be made to suit individual requirements without departing from the spirit and scope of the present invention.

I claim:

1. In a control system for a gas turbine engine having an air compressor, an air intake for delivering air to the air compressor, an exhaust nozzle, afterburner means, and a control lever operable between a minimum power and a maximum power position, control means for varying the area of said nozzle, a source of high pressure fluid, a conduit connected between said source of high pressure fluid and said control means, a first valve member having an inlet port and first and second outlet ports in series flow with said conduit, feedback mechanism operably connected between said control means and said first valve member, a second valve member adjacent said first valve member, said second valve member being adapted to control the flow rate between said inlet port and said first outlet port when moved in a nozzle opening direction and the flow rate between said inlet port and said outlet port when moved in a nozzle closing direction, a cam operatively connected to said control lever, said cam having a first portion radially contoured as a function of control lever position in the non-afterburning engine operating range and a second portion radially contoured as a function of control lever position in the afterburner operating range, said cam being contoured axially as a function of said air intake temperature, a follower member movable according to the contour of said cam, temperature sensing means responsive to said air intake temperature operably connected to said cam, a stop member fixedly secured to said follower member, abutment means slidably engaged with said stop means, said abutment means being held in contact with said second valve member by a resilient member interposed between said second valve member and said follower member, speed responsive means operably connected to said air compressor for actuating said second valve member, said second valve member being limited in movement by said stop member according to a position established by said first or said second contoured portions of said cam depending upon the control lever position to establish a maximum nozzle area, said cam being positioned axially in response to said temperature sensing means, to modify the position of said stop member, said second valve member being actuated by said speed responsive means to cause a reduction in said nozzle area to maintain the engine at a substantially constant speed.

2. In a control system for a gas turbine engine having independently rotating high and low pressure air compressors connected to separate turbines, a combustion chamber, afterburner means, a variable area exhaust nozzle, and a control lever operable over a first range of positions corresponding to non-afterburning engine operation and a second range of positions corresponding to afterburning engine operation: fluid pressure operated control means for varying the area of said exhaust nozzle, control mechanism for controlling the fluid pressure to said control means including valve means connected to control said fluid pressure, means operatively connected to said control lever and said valve means for controlling the operation of said valve means as a function of control lever position over said first range of positions to thereby establish a maximum permissible exhaust nozzle area during non-afterburning engine operation and as a function of control lever position over said second range of positions to thereby establish a different maximum permissible nozzle area for each control lever position during afterburning engine operation, said last named means including a rotatably and axially movable cam movable in one direction as a function of throttle lever position, a follower member engageable with said cam member and provided with a stop member fixedly secured thereto, means resiliently mounted on said follower member and adapted to bear against said valve means to thereby load said valve means with a force which varies as a function of the position of said follower member, means responsive to the speed of one of said compressors operatively connected to said valve means for loading said valve means in opposition to said first named force with a force which varies as a function of engine speed during said non-afterburning and afterburning engine operation, said resiliently mounted means being operative to engage said stop member in response to a predetermined decrease in said force related to engine speed to thereby prevent further movement of said valve means in a direction to cause opening movement of said exhaust nozzle, a fuel conduit for delivering fuel to said combustion chamber, and fuel control means responsive to the speed of the other of said compressors and to control lever position for controlling fuel flow through said fuel conduit to said combustion chamber.

3. In means responsive to the temperature of the air at the inlet to said compressors operatively connected to said cam member for actuating said cam member in the other direction as a function of inlet air temperature, said control system as claimed in claim 2 wherein said means for controlling the operation of said valve means includes a cam having a first portion contoured as a function of throttle lever position in the non-afterburning operating range and a second portion contoured as a different function of control lever position in the afterburning operating range.

4. In a control system for a gas turbine engine having independently operating high and low pressure air compressors connected to separate turbines, a combustion chamber, a variable area exhaust nozzle and a control lever for controlling the operation of the engine: fluid pressure operated control means for varying the area of said nozzle, control mechanism for controlling the fluid pressure to said control means including valve means connected to control said fluid pressure, movable stop means operatively connected to said valve means for limiting the movement thereof in a direction tending to cause an increase in said nozzle area, means operatively connected to said valve means and said movable stop means for actuating the same as a function of the position of said lever to thereby establish a maximum permissible nozzle area, means responsive to the speed of one of said compressors operatively connected to said valve means for actuating the same as a function of said compressor speed toward or away from said movable stop means depending upon the relative error between existing speed of said compressor and a speed request corresponding to the position of said lever, said valve means being actuated into engagement with said movable stop means in response to a decrease in the speed of said compressor whereupon said maximum possible nozzle area is maintained regardless of a further decrease in said compressor speed and being actuated in response to an increase in said compressor speed to cause a reduction in said nozzle area to thereby maintain said compressor speed at said requested value, a fuel conduit for delivering fuel to said combustion chamber, and fuel control means responsive to the speed of the other of said air compressors for controlling fuel flow through said fuel conduit to said combustion chamber.

5. In a control system as claimed in claim 4 wherein said control mechanism further includes means responsive to the air temperature at an air intake to said high and low pressure air compressors, said temperature responsive means being operatively connected to said valve means and said movable stop means for actuating the same as a function of said air intake temperature.

6. In a control system for a gas turbine engine having an air compressor, an exhaust nozzle, afterburner means, and a control lever operable between minimum and maximum power positions: fluid pressure responsive control means for varying the area of said nozzle, control mechanism for controlling the fluid pressure to said control means including valve means connected to control said fluid pressure, a cam operatively connected to said control lever, said cam having a first portion contoured as a function of control lever position in the non-afterburning engine operating range and a second portion contoured as a function of throttle lever position in the afterburner operating range, a follower member movable according to the contour of said cam, a stop member fixedly secured to said follower member, abutment means adapted to bear against said valve means and slidably engaged with said stop means, resilient means interposed between said follower member and said valve means, speed responsive means operably connected to said air compressor for actuating said valve means in opposition to said resilient means as a function of the speed of said compressor, said valve means being limited in movement by said stop member according to a position established by said first or second contoured portions of said cam depending upon the control lever position to establish a maximum permissible nozzle area, said valve means being actuated by said speed responsive means to cause a reduction in said nozzle area to maintain the engine at a substantially constant speed in accordance with the position of said control lever.

References Cited in the file of this patent

UNITED STATES PATENTS

| | | |
|---|---|---|
| 2,514,248 | Lombard et al. | July 4, 1950 |
| 2,529,973 | Sedille et al. | Nov. 14, 1950 |
| 2,545,703 | Orr | Mar. 20, 1951 |
| 2,563,745 | Price | Aug. 7, 1951 |
| 2,726,507 | Baker | Dec. 13, 1955 |
| 2,736,166 | Mock | Feb. 28, 1956 |
| 2,739,441 | Baker et al. | Mar. 27, 1956 |
| 2,750,734 | Anxionnaz et al. | June 19, 1956 |
| 2,785,848 | Lombard et al. | Mar. 19, 1957 |
| 2,807,138 | Torell | Sept. 24, 1957 |
| 2,844,936 | Fowler | July 29, 1958 |
| 2,857,739 | Wright | Oct. 28, 1958 |
| 2,921,433 | Torell | Jan. 19, 1960 |
| 2,955,416 | Hegg | Oct. 11, 1960 |

FOREIGN PATENTS

| | | |
|---|---|---|
| 517,469 | Belgium | Feb. 28, 1953 |
| 1,108,176 | France | Aug. 24, 1955 |
| 760,806 | Great Britain | Nov. 7, 1956 |

UNITED STATES PATENT OFFICE
CERTIFICATE OF CORRECTION

Patent No. 3,021,668                      February 20, 1962

Charles S. Longstreet

It is hereby certified that error appears in the above numbered patent requiring correction and that the said Letters Patent should read as corrected below.

Column 9, line 21, beginning with "3. In means" strike out all to and including "range." in line 31, same column, and insert instead the following claim:

3. In a control system as claimed in claim 2 wherein said means for controlling the operation of said valve means includes means responsive to the temperature of the air at the inlet to said compressors operatively connected to said cam member for actuating said cam member in the other direction as a function of inlet air temperature, said cam having a first portion contoured as a function of throttle lever position in the non-afterburning operating range and a second portion contoured as a different function of control lever position in the afterburning operating range.

Signed and sealed this 14th day of August 1962.

(SEAL)
Attest:
ERNEST W. SWIDER
Attesting Officer

DAVID L. LADD
Commissioner of Patents